US012438275B1

(12) United States Patent
Lee et al.

(10) Patent No.: US 12,438,275 B1
(45) Date of Patent: Oct. 7, 2025

(54) ANTENNA STRUCTURE HAVING ISOLATION METAL DISPOSED BETWEEN TRANSMITTING AND RECEIVING ANTENNAS AND ELECTRONIC APPARATUS USING THE SAME

(71) Applicant: Alpha Networks Inc., Hsinchu (TW)

(72) Inventors: Yi Ju Lee, Hsinchu (TW); Chung Hsiang Tang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 57 days.

(21) Appl. No.: 18/661,746

(22) Filed: May 13, 2024

(30) Foreign Application Priority Data

Mar. 19, 2024 (TW) ................................ 113110099

(51) Int. Cl.

*H01Q 1/52* (2006.01)
*H01Q 1/22* (2006.01)
*H01Q 1/48* (2006.01)
*H01Q 9/04* (2006.01)
*H01Q 21/06* (2006.01)

(52) U.S. Cl.

CPC ............. *H01Q 9/0407* (2013.01); *H01Q 1/22* (2013.01); *H01Q 1/48* (2013.01); *H01Q 1/523* (2013.01); *H01Q 21/065* (2013.01)

(58) Field of Classification Search

CPC .......... H01Q 1/22; H01Q 1/243; H01Q 1/246; H01Q 1/38; H01Q 1/48; H01Q 1/52; H01Q 9/0407; H01Q 21/06–08

See application file for complete search history.

(56) References Cited

U.S. PATENT DOCUMENTS 7,705,782 B2 * 4/2010 Lee ...................... H01Q 21/065 333/116
12,322,867 B2 * 6/2025 Shen ........................ H01Q 5/42

FOREIGN PATENT DOCUMENTS

| | | |
|---|---|---|
| CN | 110112567 | 8/2019 |
| CN | 112103645 | 12/2020 |
| CN | 113552539 | 10/2021 |

(Continued)

OTHER PUBLICATIONS

Taiwan Intellectual Property Office, "Office action", issued on Jul. 17, 2025.
Japan Patent Office, "Office action", issued on Jul. 23, 2025.

*Primary Examiner* — Hasan Islam
(74) *Attorney, Agent, or Firm* — WPAT, PC

(57) ABSTRACT

The disclosure provides an antenna structure and electronic apparatus using the same. The antenna structure is disposed on a dielectric substrate having a first surface and a second surface opposite to the first surface, wherein a grounding metal sub-structure is disposed on the first surface, and an electromagnetic wave transmitting sub-structure, an electromagnetic wave receiving sub-structure and an isolating metal sub-structure is disposed on the second surface. The electromagnetic wave transmitting sub-structure and the electromagnetic wave receiving sub-structure extends along a first direction, and the isolating metal sub-structure is disposed between the electromagnetic wave transmitting sub-structure and the electromagnetic wave receiving sub-structure and comprises a cross-type metal block and a plurality of straight-line-type metal block separated from each other and extends along the first direction.

10 Claims, 5 Drawing Sheets

(56) References Cited

FOREIGN PATENT DOCUMENTS

| | | |
|---|---|---|
| CN | 113659326 | 11/2021 |
| JP | 2009111463 | 5/2009 |
| JP | 2014197811 | 10/2014 |
| JP | 2016220029 | 12/2016 |
| JP | 2019519988 | 7/2019 |

* cited by examiner

ANTENNA STRUCTURE HAVING ISOLATION METAL DISPOSED BETWEEN TRANSMITTING AND RECEIVING ANTENNAS AND ELECTRONIC APPARATUS USING THE SAME

FIELD OF THE INVENTION

The present invention relates to an antenna structure and electronic apparatus using the same. More particularly, the present invention relates to an antenna structure having isolation metal disposed between transmitting antenna and receiving antenna and an electronic apparatus using the same.

BACKGROUND OF THE INVENTION

It is very common for those with ordinary skill in the art to dispose a plurality of antennas on a same printed circuit board (PCB). By using this kind of antenna design, the size of electronic apparatus having antennas could be reduced. However, because the space of the PCB is very limited, issues such as heavy signal interference between the antennas, poor communication quality, shortened transmission distance and decreased transmission speed are met since there is no sufficient isolation formed between the antennas.

SUMMARY OF THE INVENTION

Accordingly, one object of the present invention is to provide an antenna structure having better isolation built between the antennas for reducing signal interference therebetween.

Another object of the present invention is to provide an electronic apparatus of small size while using the antenna structure.

In one aspect, the present invention provides an antenna structure disposed on a dielectric substrate having a first surface and a second surface opposite to the first surface, wherein the antenna structure comprises a grounding metal sub-structure disposed at the first surface; an electromagnetic wave transmitting sub-structure disposed at the second surface and extended along a first direction, wherein the electromagnetic wave transmitting sub-structure comprises a signal input part, and an input signal received from the signal input part is correspondingly emitted from the electromagnetic wave transmitting sub-structure to outward circumstances as an emitted electromagnetic wave; an electromagnetic wave receiving sub-structure disposed at the second surface and extended along the first direction, wherein the electromagnetic wave receiving sub-structure comprises a signal output part, and an incoming electromagnetic wave received by the electromagnetic wave receiving sub-structure is converted to an output signal and outputted from the signal output part; and an isolation metal sub-structure disposed at the second surface and between the electromagnetic wave transmitting sub-structure and the electromagnetic wave receiving sub-structure, wherein the isolation metal sub-structure is extended along the first direction and comprises a cross-type metal block and a plurality of straight-line-type metal blocks separated from each other, wherein, the cross-type metal block is disposed between the signal input part and the signal output part, each of the cross-type metal block and the straight-line-type metal blocks comprises a plurality of metal holes, and each of the metal holes is connected to the grounding metal sub-structure.

In one embodiment, the antenna structure further comprises an outer isolation metal which is configured in U-shape to partially-surround the electromagnetic wave transmitting sub-structure and the electromagnetic wave receiving sub-structure. In a further embodiment, the electromagnetic wave receiving sub-structure comprises a plurality of electromagnetic wave receiving antennas, and the antenna structure further comprises a plurality of branched isolation metals, wherein each of the branched isolation metals is disposed between adjacent two of the electromagnetic wave receiving antennas.

In one embodiment, the cross-type metal block is far away from each of the straight-line-type metal block such that capacitance formed therebetween is not considered for evaluating an effect of isolating the electromagnetic wave transmitting sub-structure from the electromagnetic wave receiving sub-structure by the isolation metal sub-structure, and any two of the straight-line-type metal blocks are far away from each other such that capacitance formed therebetween is not considered for evaluating the effect of isolating the electromagnetic wave transmitting sub-structure from the electromagnetic wave receiving sub-structure by the isolation metal sub-structure.

In another aspect, the present invention provides an electronic apparatus which is characterized by using any one of the antenna structures described in the technique solutions provided herein.

By using the technique solutions described above, the cross-type metal block disposed between the signal input part and the signal output part could increase the length of current-flow existed between the signal input part and the signal output part, and furthermore, the electromagnetic bandgap (EBG)-like structure formed by the cross-type metal block and multiple straight-line-type metal blocks could increase the magnetic isolation between the electromagnetic wave transmitting sub-structure and the electromagnetic wave receiving sub-structure. Therefore, isolation between the electromagnetic wave transmitting sub-structure and the electromagnetic wave receiving sub-structure could be increased by using the antenna structure provided in the technique solutions described above, and the size of the electronic apparatus using these antenna structures could be reduced at the same time.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

It is also noted that, in order to make the description be easily understood by those with ordinary skill in the art, a first unit electrically coupled to a second unit means that electronic signals could be transmitted between the first unit and the second unit, and, unless other limitations are made, transmission of the electronic signals could be unidirectional or bidirectional, and transmitting method of the electronic signals could be wired or wireless.

Figure 1:
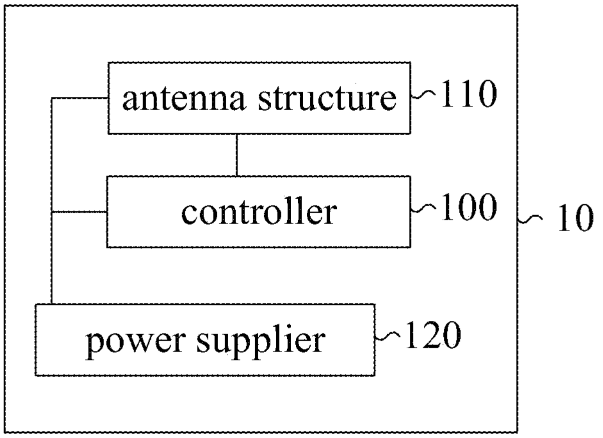
FIG. 1 is a circuit block diagram of an electronic apparatus in accordance with one embodiment of the present invention.

Please refer to FIG. 1, which is a circuit block diagram of an electronic apparatus in accordance with one embodiment of the present invention. In this embodiment, the electronic apparatus 10 comprises a controller 100, an antenna structure 110 and a power supplier 120. The power supplier 120 provides power to the controller 100 and the antenna structure 110 so that the controller 100 and the antenna structure 110 could operate normally. The controller 100 is electrically coupled to the antenna structure 110 to receive and transmit electronic data with other apparatuses. In order to make the process of receiving and transmitting electronic data be fast and accurate, enough isolation should be built between the part of the antenna structure 110 used for receiving electronic data and the part of the antenna structure 110 used for transmitting electronic data to prevent the antenna structure 110 from issues of signal interference.

Figure 2:
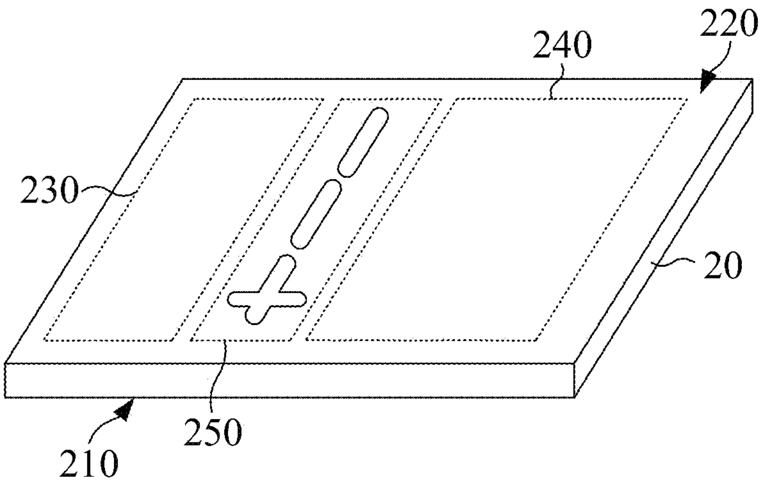
FIG. 2 is a schematic diagram of an antenna structure in accordance with one embodiment of the present invention.
Figure 3A:
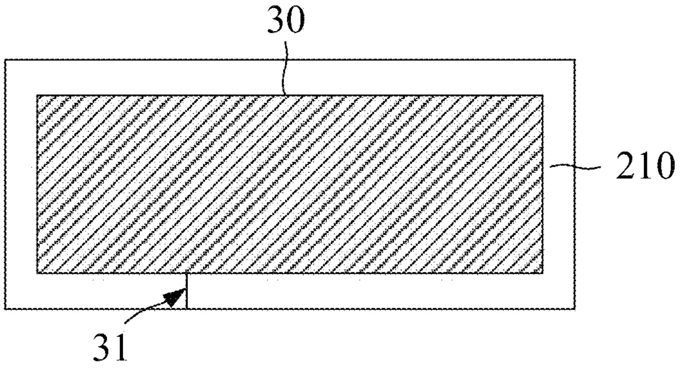
FIG. 3A is a schematic diagram of an antenna structure disposed on one surface of the dielectric substrate in accordance with one embodiment of the present invention.

Please refer to FIG. 2, which is a schematic diagram of an antenna structure in accordance with one embodiment of the present invention. In this embodiment, the antenna structure comprises a plurality of metal structures disposed on the dielectric substrate 20. As shown in FIG. 2, the dielectric substrate 20 comprises a surface 210 and a surface 220 opposite to the surface 210. A grounding metal sub-structure is disposed on the surface 210 so that the antenna structure is grounded through the grounding metal sub-structure. An electromagnetic wave transmitting sub-structure 230, an electromagnetic wave receiving sub-structure 240 and an isolation metal sub-structure 250 disposed between the electromagnetic wave transmitting sub-structure 230 and the electromagnetic wave receiving sub-structure 240 are disposed on the surface 220. The grounding metal sub-structure disposed on the surface 210 could be designed by any method known by those with ordinary skill in the art, for example, an entire metal layer could be used as the grounding metal sub-structure 30 shown in FIG. 3A. By using an entire metal layer, the grounding metal sub-structure gains the benefit of easily manufacturing, and time cost for manufacturing the antenna structure could be reduced. Furthermore, a leading conductor 31 could be disposed as well to electrically couple to the grounding metal sub-structure 30 and the power supplier 120 shown in FIG. 1 at the same time, so that the grounding metal sub-structure 30 could be grounded through a conducting path started from the leading conductor 31 to the power supplier 120.

Figure 3B:
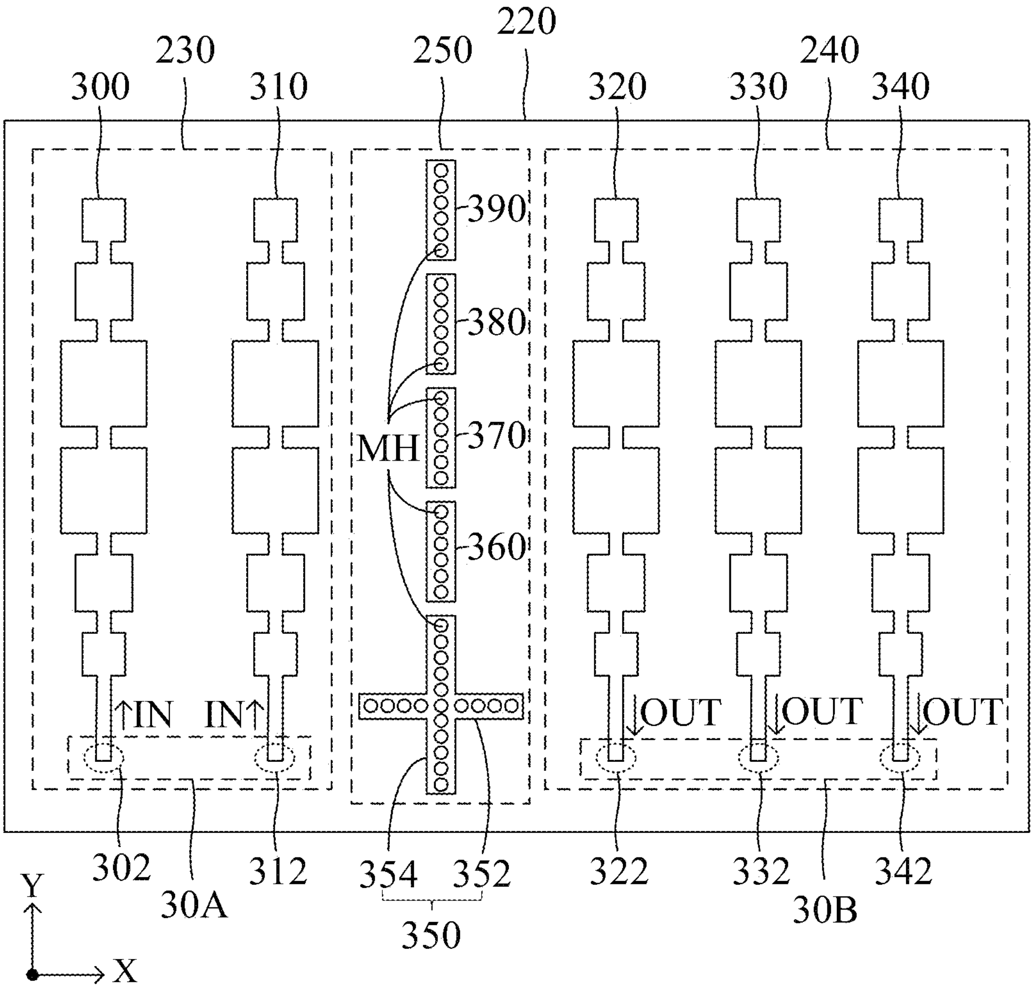
FIG. 3B is a schematic diagram of the antenna structure disposed on another surface of the dielectric substrate in accordance with one embodiment of the present invention.

Please refer to FIG. 1, FIG. 2 and FIG. 3B, wherein FIG. 3B is a schematic diagram of the antenna structure disposed on the surface 220 of the dielectric substrate 20 in accordance with one embodiment of the present invention. As described above, the electromagnetic wave transmitting sub-structure 230, the electromagnetic wave receiving sub-structure 240 and the isolation metal sub-structure 250 are disposed on the surface 220. In the embodiment, the electromagnetic wave transmitting sub-structure is extended along the Y-axis direction, that is, the electromagnetic wave transmitting sub-structure 230 comprises two electromagnetic wave transmitting antennas 300 and 310 arranged in the X-axis direction, and each of the electromagnetic wave transmitting antennas 300 and 310 is extended along the Y-axis direction. Similarly, the electromagnetic wave receiving sub-structure 240 is also extended along the Y-axis direction, that is, the electromagnetic wave receiving sub-structure 240 comprises three electromagnetic wave receiving antennas 320, 330 and 340 arranged in the X-axis direction, and each of the electromagnetic wave receiving antennas 320, 330 and 340 is extended along the Y-axis direction. It should be noted that, the electromagnetic wave transmitting sub-structure 230 and the electromagnetic wave receiving sub-structure 240 could be any structures that are able to perform functions thereof but are not limited to the types and quantities of the antennas provided in the embodiments.

In the embodiment illustrated in FIG. 3B, the electromagnetic wave transmitting antenna 300 is electrically coupled to the controller 100 shown in FIG. 1 through a signal input terminal 302, and an input signal IN transmitted from the controller 100 is received through the input terminal 302 and emitted to outward circumstances as an emitted electromagnetic wave by the electromagnetic wave transmitting antenna 300. Similarly, the electromagnetic wave transmitting antenna 310 is electrically coupled to the controller 100 through a signal input terminal 312, and the input signal IN transmitted from the controller 100 is received through the input terminal 312 and emitted to outward circumstances as the emitted electromagnetic wave by the electromagnetic wave transmitting antenna 310. In another aspect, the electromagnetic wave receiving antennas 320, 330 and 340 are electrically coupled to the controller 100 through the signal output terminals 322, 332 and 342, respectively, and an incoming electromagnetic wave received by the electromagnetic wave receiving antennas 320, 330 and 340 is firstly converted into an output signal OUT and then is transmitted to the controller 100 through the signal output terminals 322, 332 and 342, respectively.

In the following descriptions, the signal input terminals comprised in the electromagnetic wave transmitting antennas, such as the signal input terminals 302 and 312 above, would be collectively referred to as a signal input part of the electromagnetic wave transmitting sub-structure having the electromagnetic wave transmitting antennas therein. Similarly, the signal output terminals comprised in the electromagnetic wave receiving antennas, such as the signal output terminals 322, 332 and 342 above, would be collectively referred to as a signal output part of the electromagnetic wave receiving sub-structure having the electromagnetic wave receiving antennas therein.

Please refer to FIG. 3B again. In this embodiment, the isolation metal sub-structure 250 comprises a cross-type metal block 350 and a plurality of straight-line-type metal blocks 360, 370, 380 and 390 that are separated from each other. The cross-type metal block 350 and the straight-line-type metal blocks 360, 370, 380 and 390 are arranged in the Y-axis direction. The long axis of each of the straight-line-type metal blocks 360, 370, 380 and 390 is extended along the Y-axis direction. The cross-type metal block 350 is disposed between the signal input part 30A and the signal output part 30B and comprises a first metal part 352 and a second metal part 354, wherein the first metal part 352 is extended along the X-axis, the second metal part 354 is extended along the Y-axis, and the first metal part 352 is crossed with the second metal part 354. Furthermore, a plurality of metal holes MH are formed in the cross-type metal block 350 and each of the straight-line-type metal blocks 360, 370, 380 and 390, respectively, and each metal hole MH penetrates the dielectric substrate 20 so that one end of the metal hole MH is formed in the grounding metal sub-structure 30 disposed on the surface 210 while another end of the metal hole MH is formed in one of the cross-type metal block 350 and the straight-line-type metal blocks 360, 370, 380 and 390. A metal layer is formed on inner side of each metal hole MH so that the grounding metal sub-structure 30 could be electrically coupled to the isolation metal sub-structure 250 through the metal holes MH, and the metal layer of the metal holes MH could be formed by coating or any other suitable method known by those with ordinary skill in the art. The length and direction of the current-flow existed in the dielectric substrate 20 could be easily changed by applying the antenna structure described above and taking the frequency of the electromagnetic waves to be transferred into consideration while designing the distance between the adjacent metal blocks. For example, as illustrated in FIG. 5, the path of the current-flow existed between the signal input terminal 312 and the signal output terminal 322 would be changed from the path shown by the arrow 50A to the path shown by the arrows 50B, 50C, 50D and 50E. That is, the path of the current-flow would be changed from a straight line between the signal input terminal and the signal output terminal to a curved line bypassing the isolation metal sub-structure 250. Accordingly, the electric field and magnetic field generated due to the current-flow would be changed as well, and affections made by these electric and magnetic fields on the electromagnetic wave transmitting sub-structure 230 and the electromagnetic wave receiving sub-structure 240 could be reduced thereby. An equivalent circuit diagram of the isolation metal sub-structure described above is simply illustrated in FIG. 4.

Figure 4:
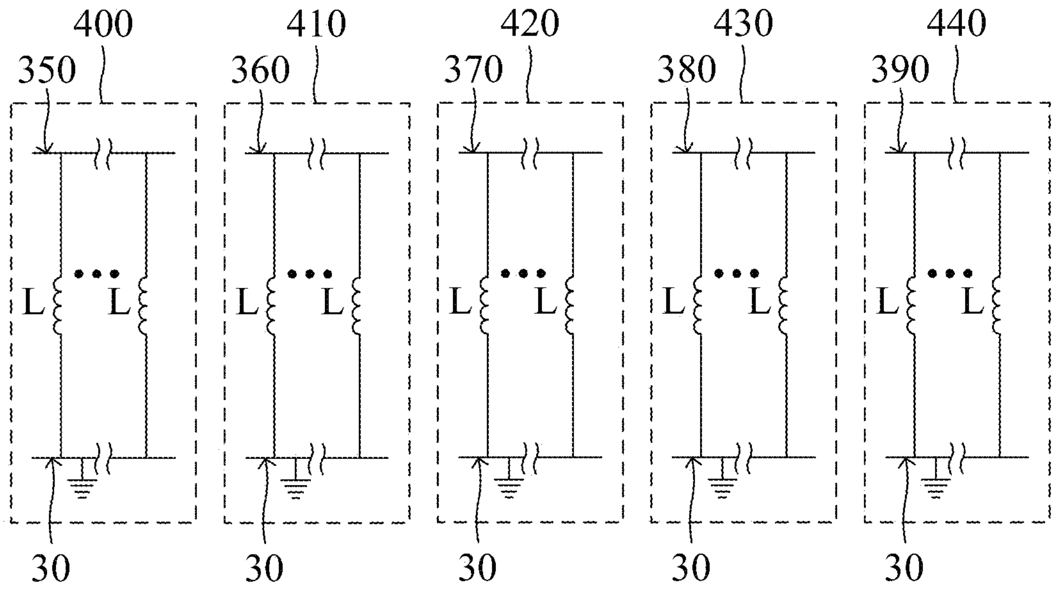
FIG. 4 is an equivalent circuit diagram of an isolation metal sub-structure in accordance with one embodiment of the present invention.
Figure 5:
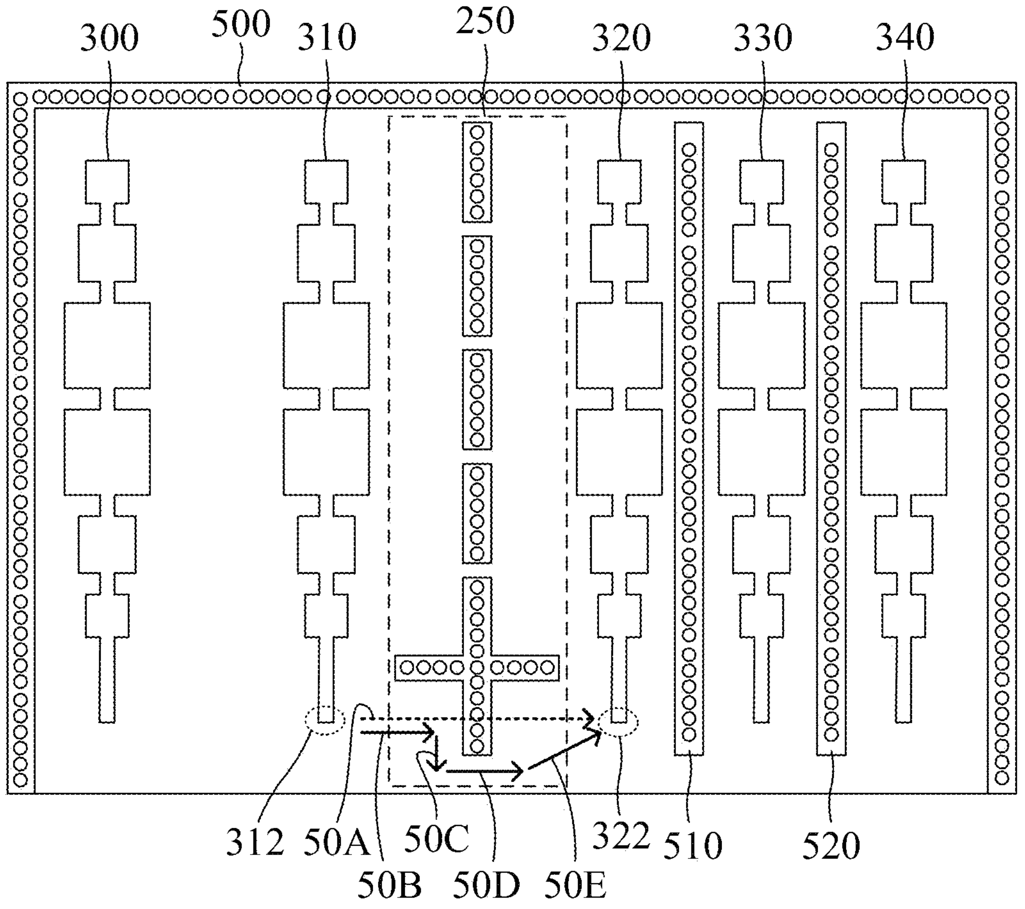
FIG. 5 is a schematic diagram of the antenna structure disposed on the surface 220 in accordance with one embodiment of the present invention.

Please refer to FIG. 4, which is an equivalent circuit diagram of the isolation metal sub-structure 250 shown in FIG. 3B. As illustrated in this figure, the equivalent circuit 400 comprises a plurality of inductors L connected in parallel, wherein each conductor L is one of the metal holes MH connected between the cross-type metal block 350 and the grounding metal sub-structure 30. Similarly, the equivalent circuit 410 comprises a plurality of inductors L connected in parallel, wherein each conductor L is one of the metal holes MH connected between the straight-line-type metal block 360 and the grounding metal sub-structure 30; the equivalent circuit 420 comprises a plurality of inductors L connected in parallel, wherein each conductor L is one of the metal holes MH connected between the straight-line-type metal block 370 and the grounding metal sub-structure 30; the equivalent circuit 430 comprises a plurality of inductors L connected in parallel, wherein each conductor L is one of the metal holes MH connected between the straight-line-type metal block 380 and the grounding metal sub-structure 30; the equivalent circuit 440 comprises a plurality of inductors L connected in parallel, wherein each conductor L is one of the metal holes MH connected between the straight-line-type metal block 390 and the grounding metal sub-structure 30.

It is noted that the capacitance formed between the cross-type metal block 350 and the straight-line-type metal block 360 is not included in the equivalent circuit diagram. This means that the distance between the cross-type metal block 350 and the straight-line-type metal block 360 nearest thereto is so large that the capacitance formed between the cross-type metal block 350 and the straight-line-type metal block 360 is so small that it is not considered for evaluating an effect of isolation provided by the isolation metal sub-structure 250. Furthermore, the capacitances formed between the cross-type metal block 350 and the straight-line-type metal blocks 370, 380 and 390 could be neglected since the capacitance formed between the cross-type metal block 350 and the straight-line-type metal block nearest thereto is negligible. Similarly, the capacitance formed between any two of the straight-line-type metal blocks 360, 370, 380 and 390 is not included in the equivalent circuit diagram, and this means that the distance between any two of the straight-line-type metal blocks 360, 370, 380 and 390 is so large that the capacitance formed therebetween would be so small that it is not necessary to consider the capacitance while evaluating the effect of isolation provided by the isolation metal sub-structure 250.

Although the capacitance formed between the metal blocks is not considered while evaluating the effect of isolation provided by the isolation metal sub-structure 250, the isolation metal sub-structure 250 could provide good isolation effect to prevent one of the electromagnetic wave receiving sub-structure and the electromagnetic wave transmitting sub-structure from being affected by each other because the length of the current-flow could be increased and the direction of the current-flow could be adjusted as well by designing the isolation metal sub-structure and the electromagnetic bandgap (EBG)-like structure formed by the cross-type metal block and multiple straight-line-type metal blocks would increase the capability of magnetic isolation. Furthermore, because the capacitance formed between any two adjacent metal blocks is not necessary while building the isolation metal sub-structure provided by this invention, the adjacent two metal blocks could be separated for a larger distance than before and the distance between the adjacent two metal blocks should not be kept at a constant value. Therefore, compared to the EBG structure which utilizes inductor-capacitor circuit (LC circuit) for providing isolation effect, the manufacturing precision required for the EBG-like structure provided in the embodiments of the present invention is reduced.

It is noted that the antenna structure provided in the above embodiments could be combined with the antenna isolation technique nowadays. Please refer to FIG. 5, which is a schematic diagram of the antenna structure disposed on the surface 220 in accordance with a second embodiment of the present invention. In this embodiment, besides the isolation metal sub-structure 250 used for building isolation between the electromagnetic wave transmitting sub-structure 230 and the electromagnetic wave receiving sub-structure 240 as shown in FIG. 3B, an outer isolation metal 500 and a plurality of branched isolation metals 510 and 520 are applied to enhance the isolation of the whole antenna structure for further reducing interferences. Wherein, a plurality of metal holes are disposed to connect the outer isolation metal 500 and the branched isolation metals 510 and 520 to the grounding metal sub-structure, respectively, in a same way as the metal holes MH discussed above. Furthermore, the outer isolation metal 500 is configured in U-shape to partially-surround the electromagnetic wave transmitting sub-structure and the electromagnetic wave receiving sub-structure such that the interference from circumstances outside of the antenna structure could be reduced thereby, wherein the electromagnetic wave transmitting sub-structure comprises the electromagnetic wave transmitting antennas 300 and 310, and the electromagnetic wave receiving sub-structure comprises the electromagnetic wave receiving antennas 320, 330 and 340. Moreover, the branched isolation metal 510 is disposed between the adjacent electromagnetic wave receiving antennas 320 and 330, and the branched isolation metal 520 is disposed between the adjacent electromagnetic wave receiving antennas 330 and 340. Therefore, there is one branched isolation metal being disposed between adjacent two electromagnetic wave receiving antennas so that the interferences from other electromagnetic wave receiving antennas could be reduced.

Figure 6:
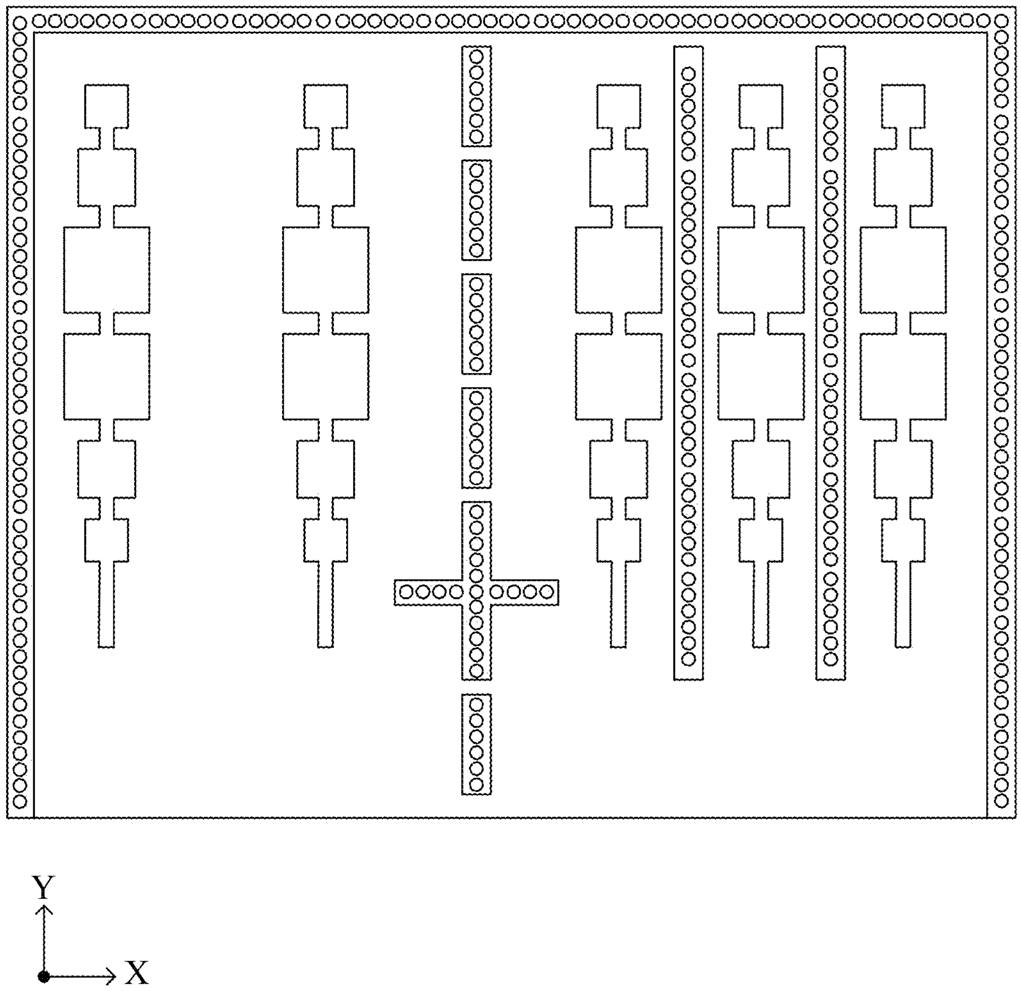
FIG. 6 is a schematic diagram of the antenna structure disposed on the surface 220 in accordance with one embodiment of the present invention.

It should be noted that although the cross-type metal block is disposed at lowest position along the Y-axis direction in the isolation metal sub-structure in the previous embodiments, there might be at least one straight-line-type metal block disposed at position lower than the cross-type metal block along the Y-axis direction as illustrated in the embodiment shown in FIG. 6.

In summary, by using the technique solutions described above, the cross-type metal block disposed between the signal input part and the signal output part could increase the length of current-flow existed between the signal input part and the signal output part, and furthermore, the EBG-like structure formed by the cross-type metal block and multiple straight-line-type metal blocks could increase the magnetic isolation between the electromagnetic wave transmitting sub-structure and the electromagnetic wave receiving sub-structure. Therefore, isolation between the electromagnetic wave transmitting sub-structure and the electromagnetic wave receiving sub-structure could be increased by using the antenna structure provided in the technique solutions described above, and the size of the electronic apparatus using these antenna structures could be reduced at the same time. Furthermore, compared to the EBG structure which utilizes inductor-capacitor circuit (LC circuit) for providing isolation effect, the manufacturing precision required for the EBG-like structure provided in the embodiments of the present invention is reduced. Accordingly, the difficulty of producing the antenna structure provided by the present invention is reduced, and the incentives for promoting and developing the technique solutions provided above would be increased.

What is claimed is:

1. An antenna structure disposed on a dielectric substrate having a first surface and a second surface opposite to the first surface, wherein the antenna structure comprises:

a grounding metal sub-structure disposed at the first surface;

an electromagnetic wave transmitting sub-structure disposed at the second surface and extended along a first direction, wherein the electromagnetic wave transmitting sub-structure comprises a signal input part, and an input signal received from the signal input part is correspondingly emitted from the electromagnetic wave transmitting sub-structure to outward circumstances as an emitted electromagnetic wave;

an electromagnetic wave receiving sub-structure disposed at the second surface and extended along the first direction, wherein the electromagnetic wave receiving sub-structure comprises a signal output part, and an incoming electromagnetic wave received by the electromagnetic wave receiving sub-structure is converted to an output signal and outputted from the signal output part; and an isolation metal sub-structure disposed at the second surface and between the electromagnetic wave transmitting sub-structure and the electromagnetic wave receiving sub-structure, wherein the isolation metal sub-structure is extended along the first direction and comprises a cross-type metal block and a plurality of straight-line-type metal blocks separated from each other, wherein, the cross-type metal block is disposed between the signal input part and the signal output part, the cross-type metal block and each of the straight-line-type metal blocks comprises a plurality of metal holes, and each of the metal holes is connected to the grounding metal sub-structure.

2. The antenna structure according to claim 1 further comprising an outer isolation metal which is configured in U-shape to partially-surround the electromagnetic wave transmitting sub-structure and the electromagnetic wave receiving sub-structure.

3. The antenna structure according to claim 2, wherein the electromagnetic wave receiving sub-structure comprises a plurality of electromagnetic wave receiving antennas.

4. The antenna structure according to claim 3 further comprising a plurality of branched isolation metals, wherein each of the branched isolation metals is disposed between adjacent two of the electromagnetic wave receiving antennas.

5. The antenna structure according to claim 1, wherein the cross-type metal block is far away from each of the straight-line-type metal block such that capacitance formed therebetween is not considered for evaluating an effect of isolating the electromagnetic wave transmitting sub-structure from the electromagnetic wave receiving sub-structure by the isolation metal sub-structure, and any two of the straight-line-type metal blocks are far away from each other such that capacitance formed therebetween is not considered for evaluating the effect of isolating the electromagnetic wave transmitting sub-structure from the electromagnetic wave receiving sub-structure by the isolation metal sub-structure.

6. An electronic apparatus, which is characterized in comprising:

an antenna structure disposed on a dielectric substrate with a first surface and a second surface opposite to the first surface, wherein the antenna structure comprises:

a grounding metal sub-structure disposed at the first surface;

an electromagnetic wave transmitting sub-structure disposed at the second surface and extended along a first direction, wherein the electromagnetic wave transmitting sub-structure comprises a signal input part, and an input signal received from the signal input part is correspondingly emitted from the electromagnetic wave transmitting sub-structure to outward circumstances as an emitted electromagnetic wave;

an electromagnetic wave receiving sub-structure disposed at the second surface and extended along the first direction, wherein the electromagnetic wave receiving sub-structure comprises a signal output part, and an incoming electromagnetic wave received by the electromagnetic wave receiving sub-structure is converted to an output signal and outputted from the signal output part; and an isolation metal sub-structure disposed at the second surface and between the electromagnetic wave transmitting sub-structure and the electromagnetic wave receiving sub-structure, wherein the isolation metal sub-structure is extended along the first direction and comprises a cross-type metal block and a plurality of straight-line-type metal blocks separated from each other, wherein, the cross-type metal block is disposed between the signal input part and the signal output part, the cross-type metal block and each of the straight-line-type metal blocks comprises a plurality of metal holes, and each of the metal holes is connected to the grounding metal sub-structure.

7. The electronic apparatus according to claim 6 further comprising an outer isolation metal which is configured in U-shape to partially-surround the electromagnetic wave transmitting sub-structure and the electromagnetic wave receiving sub-structure.

8. The electronic apparatus according to claim 7, wherein the electromagnetic wave receiving sub-structure comprises a plurality of electromagnetic wave receiving antennas.

9. The electronic apparatus according to claim 8 further comprising a plurality of branched isolation metals, wherein each of the branched isolation metals is disposed between adjacent two of the electromagnetic wave receiving antennas.

10. The electronic apparatus according to claim 6, wherein the cross-type metal block is far away from each of the straight-line-type metal block such that capacitance formed therebetween is not considered for evaluating an effect of isolating the electromagnetic wave transmitting sub-structure from the electromagnetic wave receiving sub-structure by the isolation metal sub-structure, and any two of the straight-line-type metal blocks are far away from each other such that capacitance formed therebetween is not considered for evaluating the effect of isolating the electromagnetic wave transmitting sub-structure from the electromagnetic wave receiving sub-structure by the isolation metal sub-structure.

* * * * *